(12) United States Patent
Waibel et al.

(10) Patent No.: US 8,071,656 B2
(45) Date of Patent: Dec. 6, 2011

(54) NYLON EXTRACTION FROM COMMINGLED MATERIALS

(75) Inventors: Brian J. Waibel, Kennett Square, PA (US); Hans Schonemann, Newburyport, MA (US); Val Krukonis, Lexington, MA (US); David J. Lawrence, Newark, DE (US); Joseph N. Caulfield, Aston, PA (US)

(73) Assignee: DynaSep LLC, Newark, DE (US)

( * ) Notice: Subject to any disclaimer, the term of this patent is extended or adjusted under 35 U.S.C. 154(b) by 382 days.

(21) Appl. No.: 12/397,048

(22) Filed: Mar. 3, 2009

(65) Prior Publication Data

US 2010/0228000 A1 Sep. 9, 2010

(51) Int. Cl.
*C08J 11/04* (2006.01)

(52) U.S. Cl. .......... 521/49.8; 521/40; 521/49; 521/49.5; 528/494; 528/495; 528/502 R; 528/310; 528/328; 528/338; 528/350; 528/367; 523/332; 523/343

(58) Field of Classification Search ............ 521/40, 521/40.5, 48, 49, 49.5, 49.8; 523/332, 340, 523/342, 343; 528/480, 491, 494, 496, 497, 528/498, 501, 502 R, 502 A, 502 D, 502 F, 528/503, 310, 314, 322, 323, 324, 325, 326, 528/327, 328, 329.1, 330, 331, 332, 335, 528/367, 369

See application file for complete search history.

(56) References Cited

U.S. PATENT DOCUMENTS

| | | | |
|---|---|---|---|
| 3,006,867 A | 10/1961 | Simon | |
| 3,749,698 A | 7/1973 | Lehmann, et al. | |
| 4,414,386 A | 11/1983 | Lane, Jr. | |
| 4,668,768 A | 5/1987 | Mendiratta et al. | |
| 5,198,471 A | 3/1993 | Nauman et al. | |
| 5,274,050 A | 12/1993 | Guo et al. | |
| 5,280,105 A | 1/1994 | Moran, Jr. | |
| 5,430,068 A | 7/1995 | Subramanian | |
| 5,707,634 A | 1/1998 | Schmitt | |
| 5,739,270 A | 4/1998 | Farmer et al. | |
| 5,840,773 A | 11/1998 | Booij et al. | |
| 5,849,804 A * | 12/1998 | Sarian et al. ............... 521/49.8 |
| 5,898,063 A | 4/1999 | Stefandl | |
| 5,994,417 A | 11/1999 | Roberts et al. | |
| 6,051,108 A | 4/2000 | O'Neal, Jr. | |
| 7,186,796 B2 * | 3/2007 | Krukonis et al. ............ 530/303 |
| 7,538,143 B2 | 5/2009 | Kampf et al. | |
| 7,550,516 B2 | 6/2009 | Berard et al. | |
| 2006/0035350 A1 | 2/2006 | Catchpole et al. | |

FOREIGN PATENT DOCUMENTS

| | | |
|---|---|---|
| EP | 0437451 B1 | 9/1989 |
| EP | 0 603 434 A1 | 6/1994 |
| GB | 542128 A | 12/1941 |
| GB | 688771 A | 3/1953 |
| GB | 838668 A | 6/1960 |
| GB | 1009592 A | 11/1965 |
| JP | 2000281653 A | 10/2000 |
| WO | WO 02/094908 A1 | 11/2002 |
| WO | WO 2008/077895 | 7/2008 |
| WO | WO 2010/101579 | 9/2010 |

OTHER PUBLICATIONS

Behler, et al., "New Solvent for Polyamides and its Application to the Electrospinning of Polyamides 11 and 12," *Polymer* 48 (2007) 6617-6621.

Young, et al., "The Formation Mechanism of Membranes Prepared from the Crystalline Eval Polymer-Water (nonsolvent)-2-Propanol (nonsolvent) System," *Journal of Membrane Science* 159 (1999) 21-27.

Young et al., "Morphology of Crystalline Nylon-610 Membranes Prepared by the Immersion-Precipitation Process: Competition Between Crystalization and Liquid-Liquid Phase Separation," *Polymer* 40 (1999) 5011-5021.

Zagórska, et al., "Blends of Polyaniline with Polyamide 6 Processed from Formic Acid," *Synthetic Metals* 102 (1999) 1240.

Written Opinion for International Application No. PCT/US2009/040776 mailed Sep. 15, 2011.

International Search Report for International Application No. PCT/US2009/040776 mailed Jan. 28, 2010.

* cited by examiner

*Primary Examiner* — James J Seidleck
*Assistant Examiner* — Frances Tischler
(74) *Attorney, Agent, or Firm* — Weaver Austin Villeneuve & Sampson LLP

(57) ABSTRACT

The present invention provides energetically and economically efficient methods for separating polyamide polymer(s) from commingled materials. The methods generally involve precipitating a polyamide polymer dissolved in a solvent (e.g., formic acid) using dimethyl ether (DME) as an antisolvent. The methods comprise dissolving the polyamide polymer in a solvent that (i) selectively dissolves the polyamide polymer relative to the other materials and (ii) has a higher solubility for DME relative to the polyamide polymer; and then contacting the mixture of the solvent with the dissolved polyamide polymer with DME, thereby precipitating the polyamide polymer.

27 Claims, 4 Drawing Sheets

# NYLON EXTRACTION FROM COMMINGLED MATERIALS

FIELD OF THE INVENTION

The present invention is directed to the extraction and purification of polyamide polymer(s) from commingled materials.

BACKGROUND OF THE INVENTION

Present methods for extracting polyamide polymers, including nylon, from commingled materials are neither energetically efficient nor economically viable. For example, numerous publications describe dissolving polyamide polymers in formic acid. See, e.g., U.S. Pat. Nos. 3,006,867; 3,749,698 and 5,994,417, and GB Patent Nos. 542128; 838668 and 1009592. However, these processes require heat sufficient for vaporization or distillation to remove the solvent and recover the polymer, which requires energy input and also degrades the quality of the polymer.

Antisolvent strategies for precipitation of polyamide polymers have also been described. See, e.g., U.S. Pat. Nos. 3,006,867 and 5,994,417, and GB Patent Nos. 542128; 838668 and 1009592. However, the published processes require energy input to provide heat sufficient for vaporization or distillation, or to provide temperatures and/or pressures sufficient to maintain the antisolvent at supercritical phase. Moreover, the polyamide polymer oftentimes precipitates in a form that can not be readily manipulated or used (e.g., as sticky globs).

There remains a need for energetically and economically viable methods to recover polyamide polymers from commingled materials.

BRIEF SUMMARY OF THE INVENTION

The present invention provides energetic and cost efficient methods for the extraction of polyamide polymers from commingled materials. Using the present methods, the extracted polyamide polymers are at least about 90% purified from contaminating materials, e.g., other polymers, including polyolefins (e.g., polypropylene and polyethylene) and polyesters, latex, calcium carbonate, glues, etc., after a single pass of purification. Moreover, because the present processes can be performed in the absence of heat input, i.e., at ambient temperatures, the extracted polyamide polymers are of substantially the same quality as the commingled polyamide polymers in the feedstock. The methods generally involve precipitating a polyamide polymer dissolved in a solvent using dimethyl ether (DME) as antisolvent.

Accordingly, in one aspect, the invention provides methods of separating a polyamide polymer from other materials. In some embodiments, the methods comprise:
a) dissolving the polyamide polymer in a solvent, wherein the solvent (i) selectively dissolves the polyamide polymer while substantially not dissolving the other materials and (ii) has a solubility in dimethyl ether (DME) relatively higher than its solubility in the polyamide polymer, thereby yielding a polymer solution comprised of the polyamide polymer dissolved in the solvent; and
b) contacting the polymer solution with DME, thereby yielding a second solution comprised of the solvent and DME, wherein the polyamide polymer precipitates from the second solution, thereby separating the polyamide polymer from the other materials. In some embodiments, the methods further comprise the step of separating the polymer solution from the other materials not dissolved in the solvent.

In another aspect, the invention provides methods of separating a polyamide polymer from other materials. In some embodiments, the methods comprise:
a) dissolving the polyamide polymer in a solvent that (i) selectively dissolves the polyamide polymer while substantially not dissolving the other materials and (ii) has a solubility in dimethyl ether (DME) relatively higher than its solubility in the polyamide polymer;
b) separating the polymer solution from the other materials not dissolved in the solvent; and
c) contacting the polymer solution with DME, thereby yielding a second solution comprised of the solvent and DME, wherein the polyamide polymer precipitates from the second solution, thereby separating the polyamide polymer from the other materials.

In some embodiments, the relative solubility of the solvent for DME in a mixture of the solvent with the polyamide polymer and DME is at least about 10, for example, at least about 10, 20, 50, 100 or higher, favoring the transfer of the solvent from the mixture to the DME. In some embodiments, the relative solubility for the solvent for DME in a mixture of the solvent with the polyamide polymer and DME is about 10, favoring the transfer of the solvent from the mixture to the DME.

In some embodiments, the method is performed at ambient temperature. For example, the method can be performed at a temperature in the range of about 20° C. to about 40° C., for example, in the range of about 25-35° C, for example, about 25° C., 26° C., 27° C., 28° C., 29° C., 30° C., 31° C., 32° C., 33° C., 34° C. or 35° C.

In some embodiments, the solvent is a lower aliphatic carboxylic acid. In some embodiments, the lower aliphatic carboxylic acid is selected from the group consisting of formic acid, acetic acid, propiolic acid, acrylic acid, propionic acid, isocrotonic acid, butyric acid, isobutyric acid, valeric acid, caproic acid, enanthic acid, caprylic acid, and mixtures thereof.

In some embodiments, the lower aliphatic carboxylic acid is formic acid. In some embodiments, the formic acid comprises a concentration of at least about 80%, for example, at least about 85%, 88%, 90%, 92%, 95% formic acid prior to contacting with the polyamide polymer. In some embodiments reagent grade or commodity grade formic acid is used, i.e., having a concentration of 88 wt % formic acid.

In some embodiments, the DME is maintained at a pressure that is not near or at, but is well below the critical pressure. In some embodiments, the DME is in subcritical phase. In some embodiments, the DME is in liquid phase. In some embodiments, the DME is in gas phase. In some embodiments, the DME is maintained at a pressure below its vapor pressure. In some embodiments, the DME is maintained at a pressure below 100 psi (6.89 bar; 6.80 atm). In some embodiments, the DME is maintained at a pressure below 85 psi (5.9 bar; 5.8 atm). In some embodiments, the DME is maintained at a pressure below 40 psi (2.8 bar; 2.8 atm).

In some embodiments, the ratio of DME to formic acid (w/w) is about 0.1:1.0 or greater, for example, in the range of about 200:1 to about 0.1:1.0, for example, in the range of about 1.5:1 to about 0.5:1. In some embodiments, weight ratio of DME to solvent/polyamide polymer in solution is from about 0.1 to about 0.5, for example, from about 0.15 to about 0.45, for example, about 0.15, 0.20, 0.25, 0.30, 0.35, 0.40, 0.45 or 0.50.`

In some embodiments, the polyamide polymer contacted with the solvent is at a concentration of about 25% or less, for example, in the range of about 2% to about 25%, or about 5-20%, or about 5-15%, for example, about 5%, 10%, 15%, 20%, or 25%.

In some embodiments, the polyamide polymer is nylon. For example, the nylon can be nylon 6 or nylon 6/6. In some embodiments, the polyamide polymer is selected from the group consisting of nylon 6, nylon 6,6, nylon 8, nylon 10, nylon 11, nylon 6,10, polyhexamethylene adipamide, polyamide-4,6, polyamide-12, and mixtures thereof.

In some embodiments, the polyamide polymer in the feedstock is less than 50% pure, e.g., about 30%-50% pure. In some embodiments, the polyamide polymer in the feedstock is greater than 50% pure, e.g., at least about 80% or 90% pure. In some embodiments, the polyamide in the feedstock material is in carpet.

In some embodiments, the polyamide polymer precipitated from the second solution is comprised of particles having an average diameter of at least about 50 μm, for example, at least about 60 μm, 70 μm, 80 μm, 90 μm or 100 μm, for example, in the range of about 50-300 μm or about 50-200 μm.

In some embodiments, the polyamide polymer precipitated from the second solution is in the form of free-flowing particles.

In some embodiments, the polyamide polymer precipitated from the second solution is at least 90%, for example, at least about 91%, 92%, 93%, 94%, 95%, 96%, 97%, 98%, 99% purified from the other material, e.g., in comparison to the feedstock material or by evaluating the purified polymer particles themselves.

In some embodiments, the methods further comprise the step of removing residual DME from the precipitated polyamide polymer. In some embodiments, the methods further comprise the step of separating DME from the solvent.

In some embodiments, the polyamide polymer is extracted or purified from carpet.

In a related aspect, the invention provides methods of separating nylon from commingled materials. In some embodiments, the methods comprise:
  a) dissolving the nylon in formic acid, thereby yielding a polymer solution comprised of the nylon dissolved in the formic acid;
  b) separating the polymer solution from the other materials not dissolved in the formic acid; and
  c) contacting the polymer solution with gas phase DME, thereby yielding a second solution comprised of the formic acid and DME, wherein the nylon precipitates from the second solution, thereby separating the nylon from the other materials. Further embodiments of this method are as described herein.

In a further related aspect, the invention provide methods of isolating a polyamide polymer comprising contacting a polyamide polymer dissolved in a lower alkyl carboxylic acid solvent with dimethyl ether (DME), thereby precipitating the polyamide polymer. Further embodiments of this method are as described herein.

DEFINITIONS

The term "lower alkyl carboxylic acid" refers to carboxylic acids having from 1 to 8 carbon atoms, for example, from 1 to 6, 1 to 5, 1 to 4 or 1 to 3 carbon atoms. The carboxylic acid can be straight chain or branched, and can be an alkane, alkene or alkyne. The carboxylic acid can be a monocarboxylic acid or a dicarboxylic acid. Lower alkyl carboxylic acids that find use have a pKa in the range of about 3.0 to about 5.0, for example, about 3.5-4.0. Exemplary lower alkyl aliphatic monocarboxylic acids include formic acid, acetic acid, propiolic acid (i.e., 2-propynoic acid), acrylic acid (i.e., 2-propenoic acid), propionic acid (i.e., propanoic acid), isocrotonic acid (i.e., cis-2-butenoic acid), butyric acid (i.e., butanoic acid), isobutyric acid (i.e., 2-methylpropanoic acid), valeric acid (i.e., pentanoic acid), caproic acid (i.e., hexanoic acid), enanthic acid (i.e., heptanoic acid), caprylic acid (i.e., octanoic acid), and mixtures thereof.

As used herein, the terms "commingled materials" or "other materials" interchangeably refer to materials other than the polyamide polymer being extracted. For example, in carpet, the polyamide polymer is oftentimes commingled with other polymers, including polyolefin (e.g., polypropylene and/or polyethylene) and polyester polymers, as well as other materials, including latex, calcium carbonate, glues, etc.

The terms "selectively dissolves" or "preferentially dissolves" interchangeably refer to a solvent that is relatively more soluble with, and therefore dissolves, a polyamide polymer in comparison to other materials commingled with the polyamide polymer. Other materials can include other polymers, e.g., polyolefins (e.g., polypropylene and polyethylene) and polyesters, latex, calcium carbonate, glues, etc. In some embodiments, a solvent that selectively or preferentially dissolves a polyamide polymer is not soluble with, and therefore does not dissolve or substantially does not dissolve, the other materials commingled with the polyamide polymer. In some embodiments, less than 10%, for example, less than 9%, 8%, 7%, 6%, 5%, 4%, 3%, 2% or 1%, of the dissolved materials are a material other than a polyamide polymer. In some embodiments, the solvent that selectively or preferentially dissolves a polyamide polymer dissolves at least about 10-fold more, e.g., about 20-fold, 50-fold or 100-fold more, polyamide polymer in comparison to its capability to dissolve the other material commingled with the polyamide polymer. Assays for determining the amount of polyamide polymer dissolved in the solvent are known in the art. At 25° C., about 1.5 wt % to about 17 wt %, for example, about 10 wt % to about 15 wt % polyamide polymer is dissolved in the solvent. The concentration of dissolved polyamide polymer can be increased at higher temperatures. In contrast, less than about 10 parts per million (ppm) of the other contaminating materials are dissolved in the solvent.

The term "relatively higher solubility" or "solvent that has a solubility in dimethyl ether (DME) relatively higher than its solubility in the polyamide polymer" refers to the relative solubility of solvent for DME in comparison to the polyamide polymer. Solubility refers to the amount of a substance that will dissolve in a given amount of another substance. In the context of the present invention, the solvent has a relatively higher solubility for the antisolvent DME in comparison to the polyamide polymer, thereby favoring the transfer of the solvent from the polyamide polymer and into the DME, leaving the polyamide polymer to precipitate out of solution.

As used herein, the "relative solubility" (RS) is measured at equilibrium and is defined:

$$RS = \frac{\text{Concentration of all forms (ionized and unionized)}}{\text{Concentration of all forms (ionized and unionized)}} \\ \text{of the solvent in DME solution} \\ \overline{\text{of the solvent in the polyamide}}$$

The units of concentration are the same, and can be, e.g., weight percent (e.g., w/v), mole percent, g/mL, etc. The relative solubility can be measured using any method known in the art, e.g., high performance liquid chromatography (HPLC), gas chromatography (GC), UV/VIS spectroscopy, etc.

In some embodiments, the relative solubility of the solvent for the antisolvent DME is at least about 10-fold, for example, about 20-fold, 50-fold or 100-fold higher, in comparison to its solubility for the polyamide polymer, thereby favoring the transfer of the solvent from the polyamide polymer to the DME. In some embodiments, the relative solubility of the solvent for the antisolvent DME is at least about 50-fold higher in comparison to its solubility for the polyamide polymer, thereby favoring the transfer of the solvent from the polyamide polymer to the DME. Accordingly, in some embodiments, the relative solubility of the solvent in DME versus the polyamide polymer is at least about 10, for example, about 20, 50, 100 or higher.

The term "subcritical phase" refers to a compound that is maintained at a temperature and/or pressure that is below its critical temperature and/or pressure. A compound maintained in subcritical phase can be in either gas phase or liquid phase, or both (i.e., a dense gas). The critical point of dimethyl ether is 127° C. and 774.5 psi (53.4 bar; 52.7 atm). In some embodiments, the antisolvent DME is maintained at a pressure well below its critical pressure, e.g., at a pressure of about 145 psi (10 bar; 9.87 atm) or less.

DETAILED DESCRIPTION

1. Introduction

Figure 1:
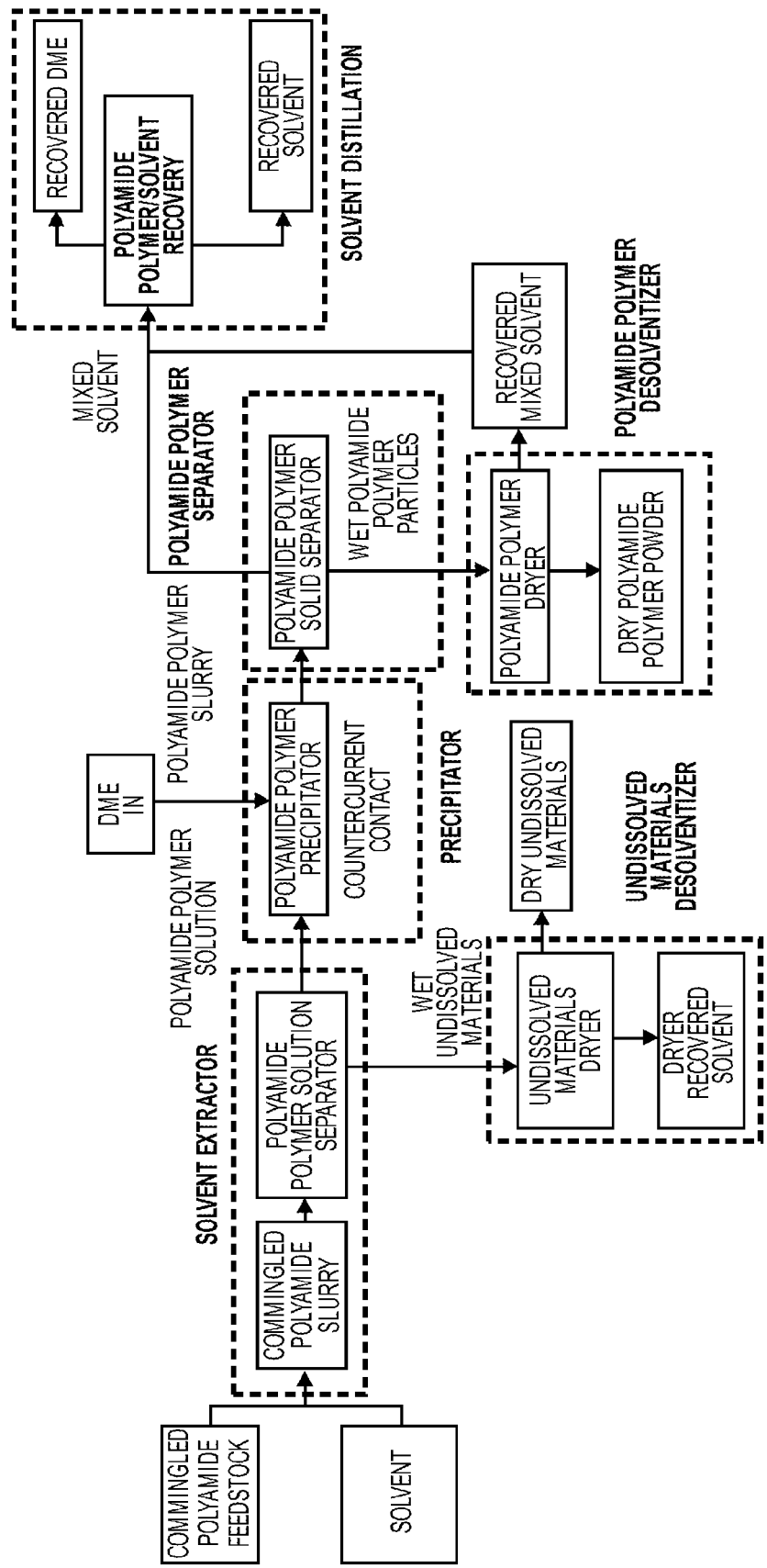
FIG. 1 illustrates a schematic of the processes of the present invention.

The present invention provides energetically and economically efficient methods for separating polyamide polymers from commingled materials. The methods generally comprise precipitating polyamide polymer dissolved in a solvent (e.g., formic acid) by contacting with dimethyl ether (DME) as an antisolvent. In some embodiments, the methods involve first preferentially or selectively dissolving the feedstock containing the polyamide polymer and other material in a solvent and then precipitating the polyamide polymer from the solvent using dimethyl ether (DME) as antisolvent. The precipitated polyamide polymer is highly purified after a single purification pass. Because the present processes do not require the input of heat and can be performed at ambient temperatures, the precipitated polyamide polymer is of a substantially equivalent quality (e.g., molecular weight distribution, tensile strength, viscosity, etc.) in comparison to the polyamide polymer in the feedstock. Moreover, using dimethyl ether as the antisolvent has the unexpected advantage of precipitating the polyamide polymer as discrete, free-flowing particles that can be easily collected and further manipulated. The methods can be performed at ambient temperatures and pressures providing for energetic and economic efficiency in recovering polyamide polymers, including nylon, from commingled materials. Further contributing to the economic and energetic efficiencies of the present processes, the methods can be practiced in a continuous flow manner, allowing for continuous input of commingled polyamide feedstock, precipitation and collection of purified polyamide polymer, and recovery and recycling of solvent and DME antisolvent.

2. Dissolving the Polyamide Polymer in a Solvent a. Polyamide Polymers

The methods find use for the separation, purification, and/or extraction of any polyamide polymer known in the art. Polyamide polymers suitable for extraction using the present processes include those that dissolve in or are miscible with a lower alkyl carboxylic acid solvent, as described herein (e.g., formic acid), and that are essentially immiscible in dimethyl ether.

Polyamide polymers that can be purified or extracted in accordance with the processes of the present invention include polyamide polymers that are frequently found in carpets. Post-consumer carpet waste is generally three predominant components: backing fiber, face fiber, and non-fibrous backing materials. The most common face fibers are polyamides, e.g., Nylon 6 and Nylon 6,6.

In some embodiments, the extracted polyamide polymer is a nylon, for example, Nylon 6 (poly-6-aminocaproic acid), Nylon 6,6 (poly-hexamethyleneadipamide), Nylon 8 (poly-8-aminocaprylic acid), Nylon 10 (poly-10-aminodecanoic acid), Nylon 11 (poly-11-aminoundecanoic acid), and Nylon 6,10 (polyhexamethylene sebacamide), polyhexamethylene adipamide, and mixtures thereof. Also, lesser found polyamides including, for example, polyamide-4,6 (PA-4,6), polyamide-12 (PA-12), and the like, as well as mixtures thereof, can be extracted or purified by the present invention. In some embodiments, the nylon subjected to the present processes is Nylon 6 or Nylon 6,6.

The polyamide polymer delivered as feedstock and dissolved in the solvent is commingled with other contaminating materials, e.g., other polymers, including polyolefins (e.g., polypropylene and polyethylene) and polyesters, latex, calcium carbonate, glues, etc. For example, polypropylene is present in the primary and secondary backing of most carpets, generally in the form of woven ribbons or nonwoven fabric. In addition, polypropylene fiber is sometimes found as the face fiber. Backing compositions generally contain binders such as SBR latex and fillers such as calcium carbonate. Commercial carpet may employ mixed polyolefin, polyvinyl chloride, or polyurethane non-fibrous backing components. A typical carpet composition may be about 47 wt % nylon (either nylon 6 or nylon 6/6), 16 wt % polypropylene (PP), 24 wt % calcium carbonate ($CaCO_3$), and 13 wt % latex. The PP, $CaCO_3$, and latex are carpet backing material and are insoluble (i.e., do not dissolve) in formic acid.

The fiber component of the overall post-consumer carpet waste stream contains approximately 40% nylon 6; 40% nylon 6,6; and 10% polypropylene. Sorting carpet pieces according to face fiber type before the pieces are shredded, further size-reduced, and separated into a fibrous component and a non-fibrous binder and dirt component, can yield segregated commingled fiber wastes composed of about 80% nylon 6 or nylon 6,6 and about 5% to 10% polypropylene. This amount of polypropylene polymer in polyamide degrades the physical properties of the polyamide polymer to such an extent that it is unsuitable for virtually all typical nylon 6 or nylon 6,6 applications. Thus, the utility of nylon 6 and nylon 6,6 polymers recovered from waste is, to a great extent, dependent upon the absence of polyolefin polymer contaminants. In some embodiments, the commingled feedstock material contacted with the solvent usually contains in the range of about 30-50% polyamide polymer.

The concentration of the polyamide polymer dissolved in the solvent is about 25% or less, for example in the range of about 2-25% polyamide polymer. In some embodiments, the polyamide polymer dissolved in the solvent is at a concentration of about 5-20% or 5-15%, for example, about 5%, 10%, 15%, 20% or 25% polyamide polymer.

In some embodiments, the feedstock material is nylon-containing carpet. The carpet is broken down into manageable-sized pieces using methods known in the art, e.g., is subject to mechanical shredding or the face fibers are shaved from the backing and isolated, before being immersed in the solvent. In some cases, the components of the carpet, i.e., the backing and the fibers, are separated before processing. Procedures and processes for preparing carpet for recycling and nylon extraction are well known and described, for example, in U.S. Pat. Nos. 5,518,188; 5,535,945; 5,840,773; 5,859,071; 5,898,063; 6,241,168; 6,752,336; 7,067,613;

Briefly, carpet feedstock can be in rolls or otherwise oversized scraps. The carpet feedstock can be subjected to a mechanical size-reduction processes to break down the carpet into its fibrous components (i.e., face fibers and olefin backing fibers). Size reduction can be effected by first shredding (e.g., ripping in a shredder) and thereafter granulating the carpet feedstock. Carpet size-reduction, can be carried out as a dry process, and can be performed as either a batch or continuous process.

Carpet shredding can be achieved using conventional shredding equipment. The subsequent granulating of the shredded carpet can be achieved by subjecting the carpet pieces to a rotating blade classifier, e.g. characterized by rotating knives that integrate with stationary bed knives. Other means to disintegrate the carpet waste into fibrous components and such means also find use. See, e.g., Green and Perry, Perry's Chemical Engineers' Handbook, 8$^{th}$ Edition, 2008, McGraw-Hill.

The carpet feedstock usually includes substantially more face fiber than olefin fabric backing, for example, about 90 weight percent face fibers and about ten weight percent olefin fabric backing. Those having ordinary skill in the art will appreciate that olefin backing fabrics tend to granulate differently than face fibers. In particular, the size-reduced olefin backing fibers are generally longer and coarser than the size-reduced face fibers. Consequently, the size-reduced fiber may be adequately characterized by describing the face fiber fraction.

In some embodiments, carpet material in the size range of about 0.25 to about 0.5-1.0 inch average diameter is introduced into a tank containing the solvent. In some embodiments, the mean length of the size-reduced face fibers is less than about 15 mm, for example, less than about 10 mm, for example, between about 3 mm and 7 mm (e.g., about 5 mm). Optionally, fibers of a desired length can be selected and/or sorted by subjecting the face fibers to filters or screens.

b. Solvent

Functionally, solvents for use in the present processes include those that have the combined attributes of (i) selectively or preferentially dissolving a polyamide polymer (e.g., nylon) in comparison to the commingled materials (e.g., polyolefin polymers, polyester polymers), and (ii) having a solubility for dimethyl ether that is greater than its solubility for the polyamide polymer. That is, the solvent (i) selectively or preferentially dissolves the polyamide polymer to form a solvent and polyamide polymer solution without substantially dissolving the other commingled materials, and (ii) is relatively more miscible with the antisolvent dimethyl ether than in the polyamide polymer. As defined herein, the relative solubility of the solvent in DME versus the polyamide polymer is at least about 10, for example, about 10, 20, 50, 100 or higher, leading to a higher concentration of the solvent in the dimethyl ether than in the polyamide and causing the polyamide polymer to precipitate.

Structurally, the solvent can be a lower alkyl aliphatic carboxylic acid, for example, an aliphatic carboxylic acid containing from 1-8 carbons, for example, 1-6, 1-4 or 1-3 carbons, branched or straight, in the form of an alkane, an alkene, or an alkyne. The solvent can be either a monocarboxylic acid or a dicarboxylic acid. Lower alkyl carboxylic acids that find use are liquids or oily liquids at the operating temperatures, e.g., at temperatures less than about 70° C., e.g., at temperatures in the range of about 20-70° C. or 20-40° C., e.g., at ambient temperatures. Lower alkyl carboxylic acids that find use have a pKa in the range of about 3.0 to about 5.0, for example, about 3.5-4.0.

Exemplary lower alkyl aliphatic monocarboxylic acids include formic acid, acetic acid, propiolic acid (i.e., 2-propynoic acid), acrylic acid (i.e., 2-propenoic acid), propionic acid (i.e., propanoic acid), isocrotonic acid (i.e., cis-2-butenoic acid), butyric acid (i.e., butanoic acid), isobutyric acid (i.e., 2-methylpropanoic acid), valeric acid (i.e., pentanoic acid), caproic acid (i.e., hexanoic acid), enanthic acid (i.e., heptanoic acid), caprylic acid (i.e., octanoic acid), and mixtures thereof.

Exemplary lower alkyl aliphatic dicarboxylic acids include oxalic acid, fumaric acid, succinic acid, malonic acid, tartaric acid, citric acid, and mixtures thereof.

In some embodiments, the solvent is formic acid. Formic acid solvent can be delivered in a feed stream at a concentration of at least about 80 wt %, for example, at least about 85 wt %, 88 wt %, 90 wt %, 92 wt %, 94 wt %, 96 wt % or totally anhydrous formic acid (100 wt %). Reagent or commodity grade formic acid, commercially available at 88 wt % formic acid, finds use in the present methods.

c. Mixing the Solvent with the Polyamide Polymer

The polyamide polymer is contacted with the solvent and mixed under conditions sufficient to dissolve the polyamide polymer in the solvent. The polyamide polymer and solvent can be mixed using any method known in the art, for example, exposing the mixture of polyamide polymer and solvent to mechanical agitation, stirring or shaking. The agitation, stirring or shaking is sufficient to homogenize the mixture without shearing, breaking down, or otherwise damaging the integrity of the polymer. Suitable mixers are readily commercially available and known in the art.

The polyamide polymer can be dissolved in the solvent without the input of heat, i.e., the polyamide polymer can dissolve in the solvent at ambient temperature, e.g., at temperatures in the range of about 20-40° C., for example, about 25-35° C. The step of dissolving the polyamide polymer in the solvent can also be performed at ambient pressure.

In some embodiments, the polyamide polymer is dissolved in the solvent under conditions of mild heat, e.g., with the addition of heat sufficient to dissolve the polymer in the solvent without breaking down or damaging, or otherwise changing the composition of the polyamide polymer. In some embodiments, the polyamide polymer is dissolved in the solvent at a temperature of about 70° C. or less, for example in the range of about 40-60° C., for example, at a temperature of about 40° C., 50° C., 60° C. or 70° C.

The temperature can be maintained at a single constant temperature, or adjusted to a higher or a lower temperature throughout the mixing process, as desired. For example, the solvent can be heated in the input stream before contacting the polyamide polymer, and then allowed to cool to ambient temperature during the mixing and dissolving of the polyamide polymer. Heating of the solvent is not required. In some embodiments, the solvent is heated to a temperature sufficient to decrease the time to dissolve the polyamide in solution and to increase the solubility limit of the polyamide in the solvent.

Generally, the solvent is mixed with the feedstock material containing the polyamide polymer such that the mixture contains about 25 wt % or less of the polyamide polymer, for example in the range of about 2-25 wt %, 5-20 wt %, 5-15 wt % polyamide polymer, for example, about 2 wt %, 5 wt %, 10 wt %, 15 wt %, 20 wt % or 25 wt % polyamide polymer.

The mixture produces a slurry comprised of the dissolved polyamide polymer in the solvent, undissolved polyamide polymer, and undissolved contaminating materials.

3. Separating the Polymer Solution from the Other Materials

Undissolved contaminating materials (e.g., polyolefin polymers, polyester polymers, glue, dirt) can be removed from the polymer solution, containing the dissolved polyamide polymer and the solvent, using any method known in the art.

Generally, the undissolved solids are separated from the polymer solution containing the polyamide polymer dissolved in the solvent using passive or mechanical means. For example, the undissolved solids can be allowed to settle, and the polymer solution can be decanted from the top, leaving the precipitated solids. Separation of the undissolved solids can also be facilitated by mechanical means, for example, using a press or centrifugal force. The polymer solution can also be separated from the undissolved solids using filtration.

In some embodiments, solution containing the polyamide polymer dissolved in the solvent is decanted from the undissolved solids and then passed through a filter before proceeding to the step of precipitation with DME antisolvent.

Separation of the polymer solution from the undissolved solids can be performed at ambient temperature and ambient pressure.

Optionally, the undissolved solids can be subjected to a further round of extraction with the solvent. Contaminating solvent within the undissolved solids can be removed by vaporization and/or neutralized with an alkaline solution.

4. Contacting the Polymer Solution with Dimethyl Ether (DME)

The polymer solution comprising the polyamide polymer dissolved in the solvent is contacted with dimethyl ether (DME) as antisolvent under conditions sufficient to precipitate the polyamide polymer.

In some embodiments, the polymer solution is contacted with DME that is in subcritical phase, i.e., at a temperature and pressure that is below the critical temperature and pressure for DME. Generally, in performing the present methods, the DME is delivered and maintained at ambient temperature and at a pressure that is well below its critical pressure of about 774.5 psi (53.4 bar; 52.7 atm).

In some embodiments, the DME is delivered and maintained in liquid phase. For example, the DME is delivered and maintained at a pressure at or above the vapor pressure, e.g., above about 85 psi (5.9 bar; 5.8 atm) and below 145 psi (10 bar; 9.87 atm).

In some embodiments, the DME is delivered and maintained in gas phase. In some embodiments, the DME is maintained at a pressure below its vapor pressure, e.g., below about 100 psi (6.89 bar; 6.80 atm), or below about 85 psi (5.9 bar; 5.8 atm), for example, at about 80 psi (5.52 bar; 5.44 atm), 70 psi (4.83 bar; 4.76 atm), 60 psi (4.14 bar; 4.08 atm), or 50 psi (3.45 bar; 3.40 atm). In some embodiments, the DME is maintained at a pressure below 40 psi (2.8 bar; 2.8 atm). In some embodiments, the DME is delivered at ambient pressure. For example, in one embodiment, DME at an introduction pressure of 85 psi (5.9 bar; 5.8 atm) is delivered to a solution concentration of 10 wt % polyamide in formic acid.

In some embodiments, the DME is maintained at a constant pressure throughout the process. In some embodiments, the DME the pressure of the DME is varied. For example, the DME can be delivered under low or ambient pressure to induce initial precipitation of polyamide polymer, and then exposed progressively to one or more higher pressure levels to facilitate continued precipitation of polyamide polymer. Using the present methods, at least about 90%, 93%, 95%, 97%, 99% of the polyamide polymer dissolved in the solvent is precipitated out. In some embodiments, essentially all the polyamide polymer dissolved in the solvent is precipitated out.

The DME is added in an amount such that the DME ratio with solvent is about 0.1:1.0 or greater (i.e., about 1:10 or greater) DME:solvent. In some embodiments, the DME is added in an amount such that the ratio of DME:solvent is in the range of about 200:1.0 to about 0.1:1.0 (i.e., 1:10 DME:solvent), for example in the range of about 1.5:1.0 to about 0.5:1 DME:solvent ratio. In some embodiments, weight ratio of DME to solvent/polyamide polymer in solution is from about 0.1 to about 0.5, for example, from about 0.15 to about 0.45, for example, about 0.15, 0.20, 0.25, 0.30, 0.35, 0.40, 0.45 or 0.50.

The DME can be contacted and mixed with the polymer solution comprising the polyamide polymer dissolved in the solvent using any method known in the art. Those of skill will appreciate that the delivery method will be appropriate to the phase of the DME antisolvent, e.g., liquid or gas phase. The DME can be delivered in continuous or batch processing, with sufficient agitation to mix homogeneously with the polymer solution and induce precipitation of the polyamide polymer. In some embodiments, the DME is contacted with the polymer solution in a countercurrent manner. For example, gas-phase DME can be bubbled up through a vertical column through which the polymer solution is being poured down.

For the purpose of exemplification, in one embodiment, the polymer solution containing the polyamide polymer dissolved in the solvent enters into a vertical antisolvent column. The polymer solution is pumped up to pressure above the vapor pressure of DME (e.g., above about 100 psi (6.89 bar; 6.80 atm) at 25° C.) and the pressure to establish appropriate flow through a spray nozzle. The nozzle and delivery pressure is arranged such that the fluid stream is broken into droplets in a size range of 100 to 750 micron. The column is vertically oriented, is pressurized, and is fully filled with liquid DME. The fluid is sprayed into the column. Upon contact with the DME antisolvent, the polyamide polymer precipitates from solution with the solvent. The size and morphology of the resulting particle can be determined by the nozzle design, delivery pressure, and viscosity of the polyamide polymer fluid stream, and temperature of the DME. Nominally, the first three factors have the most significant influence on the particle size.

Larger precipitated particles will have a larger Stoke's settling velocity (SSV). For example, precipitated particles with an average diameter of about 25 μm have an SSV of about 1.25 mm/sec; precipitated particles with an average diameter of about 50 μm have an SSV of about 5.0 mm/sec; precipitated particles with an average diameter of about 100 μm have an SSV of about 20 mm/sec; precipitated particles with an average diameter of about 150 μm have an SSV of about 45 mm/sec. In some contexts, larger particles, e.g., with an average diameter of about 100 μm, with a faster SSV are more readily handled for further processing.

Recycled, liquid DME can be introduced into the base of the column. The polyamide polymer particles are heavier than the DME and, hence, sink. The DME is lighter and, hence, flows up the column. As the fresh DME passes by the particles, residual solvent within the particle interior is extracted. The column can be adjusted in length to enable sufficient residence time contact between the polyamide polymer particles with the rising DME in the column. The particle diameter and column length determine the amount the residual solvent within the particle. Thus, it is desirable to limit the maximum dimension of the particles, e.g., to an average diameter of about 1000 μm to limit the diffusion distance from the particle center to the surface in contact with the DME.

As the DME moves up the column, it dissolves the solvent. The DME/solvent liquid solution is discharged in the column at a fluid level above the elevation of the nozzle. The DME/solvent stream can then pass onto a liquid recovery step.

5. Recovery of DME and Solvent

In some embodiments, the methods further comprise the step of recovering the DME from the solvent and/or the precipitated polyamide particles. This can be done using any method known in the art. For example, the DME/solvent solution can be passed through a heating heat exchanger (i.e., vaporizer) that imparts sufficient enthalpy into the stream to enable the DME to flash to vapor upon flowing through a pressure reduction valve into a separator. Following the pressure reduction valve, a DME-dominated vapor stream and a solvent-dominated liquid stream results. The DME vapor may still contain a minor component of the solvent. The DME-dominated stream can be subsequently passed through a cooling heat exchanger (i.e., condenser) to liquify the DME. This recycled DME can be fed back to the antisolvent column.

In some embodiments, the methods further comprise the step of recovering the solvent from the DME and/or the precipitated polyamide particles. This can be done using any method known in the art. The solvent-dominated stream has approximately 20-25 wt % DME dissolved in the liquid solution. This stream may be used as is or may be subsequently subjected to distillation to remove the DME from solvent-stream. The decision for proceeding with recovery or use of the residual DME in the solvent is contingent potential safety issues associated with handling a flammable vapor.

6. Collecting Precipitated Polymer

The polyamide polymer precipitates upon contact of the DME in free-flowing powdery particles, that can be readily manipulated for further processing. The precipitate is not sticky. The particles are usually of an average diameter of at least about 50 μm, for example with an average diameter of about 50-300 μm, for example, about 50-200 μm or about 50-150 μm, for example, an average diameter of about 50 μm, 75 μm, 100 μm or 150 μm. The particles will generally have an average diameter of less than about 1000 μm, for example, less than 750 μm or less than about 500 μm.

The precipitated polyamide particles can be separated from residual solvent and DME using any method known in the art. For example, the precipitated polyamide particles can be physically removed from the solvent and DME, e.g., using mechanical means, e.g., an auger, a conveyer belt, a screen, etc. The precipitated polyamide particles can then be subject to drying conditions, e.g., by exposing to a temperature sufficient to evaporate the solvent without a causing damage or breakdown of the precipitated polyamide polymer. Residual DME can be removed by reducing the pressure such that the DME can be recovered in its gas phase.

For example, in one embodiment, the precipitated polyamide particles are passed through an inclined auger to drain the interstitial liquid DME from the particles. Subsequent to this action, the particles pass through a valve (e.g., a butterfly valve) into a hold-up chamber. The chamber is sealed and a vacuum applied. After a vacuum in the range of about 100 Torr (100 mm Hg=~2 psi) is applied, a minor component of steam is added to the chamber. This steam vaporizes the DME, making the DME a minor component of the vapor pressure. The steam acts to displace the DME from the nylon particles. The system is restored to atmospheric conditions by bleeding air into the chamber. A second valve is opened to discharge solid nylon back to atmospheric conditions.

The polyamide processes of the present invention allow for the substantial purification of the polyamide polymer from the commingled feedstock material with a single pass of purification. After subjecting the feedstock material containing the polyamide polymer commingled with other materials to present extraction procedures, the precipitated polyamide particles are at least 90% purified from the other commingled materials in the feedstock materials, for example, at least 91%, 92%, 93%, 94%, 95%, 96%, 97%, 98% or 99% purified from the other commingled materials in the feedstock materials. That is, less then 10% of the precipitated particles are a material other than a polyamide polymer, for example, less than 9%, 8%, 7%, 6%, 5%, 4%, 3%, 2% or 1% of the precipitated particles are a material other than a polyamide polymer.

Moreover, the quality of the precipitated polyamide polymer is substantially the same as the polyamide polymer in the feedstock material. For example, the molecular weight distribution of the precipitated polyamide polymer is substantially the same as the molecular weight distribution of the polyamide polymer in the feedstock material. The molecular weight distribution of the polyamide polymer can be determined by any method known in the art, for example, Gel Permeation Chromatography (GPC). By employing the present methods, the polydispersity index (PDI), material toughness, tensile strength, and total elongation characteristics of the precipitated polyamide polymer is substantially the same as the polydispersity index (PDI), material toughness, tensile strength, and total elongation characteristics, respectively, of the polyamide polymer in the feedstock material. In some embodiments, the PDI of the purified polyamide polymer is less than 2.0, for example, about 1.80-2.0.

EXAMPLES

The following examples are offered to illustrate, but not to limit the claimed invention.

Example 1

Recovery of Nylon from Carpet

This example demonstrates the successful extraction of nylon from carpet samples using formic acid (FA) as a solvent and dimethyl ether (DME) as an antisolvent. Carpet fibers were first separated from carpet backing before processing. Experiments MCR-4, MCR-7, and MCR-8 used Nylon 6. Experiments MCR-5, MCR-6, and MCR-9 used Nylon 6/6. The carpet colors were intentionally selected to represent a color spectrum. For Nylon 6, this was from light beige (typical of the bulk of the carpet market) to a dark blue. For Nylon 6/6, this was from light beige to a purple. The formic acid used was ACS reagent grade, which has about 88% or greater concentration of formic acid (e.g., Sigma Aldrich No. 399388). Higher concentration solutions of formic acid also find use.

About 5% wt nylon in carpet fibers was dissolved in 88 wt % concentration formic acid solution. At the pilot scale, about 30 mL of the mixture containing the nylon dissolved in formic acid was placed in a 120 mL vessel. The vessel was vertically oriented, with stainless steel filters at both ends. Dimethyl Ether (DME) antisolvent gas is delivered into the bottom opening and flows out the top. DME was introduced at about 80 psi (5.5 bar; 5.4 atm), which is below its vapor pressure (at 24° C., the saturation pressure for DME is about 85 psi (5.86 bar; 5.78 atm). The nylon "catastrophically" precipitated from the formic acid solution upon introduction of the DME. About 2 volumes (i.e., 240 mL) of DME was flushed through the vessel. The precipitated nylon solids remained within the vessel.

Table 1 summarizes the qualitative description of the nylon recovered using formic acid solvent/DME anti-solvent precipitation. Surprisingly and importantly, the precipitated nylon using formic acid solvent and DME antisolvent was a fluffy solids. The fluffy powder form is readily handled.

analysis was to determine whether the process of FA followed by DME precipitation caused any significant change in the polymer's molecular weight distribution. The molecular weight distribution reflects the polymer's strength, fatigue properties, and relative viscosity during melt processing. The extraction process, which uses an acid in the presence of water (e.g., formic acid at a concentration of at least about 88 wt. %), has the potential to degrade the polymer through hydrolysis of the polymer chain.

TABLE 2

Samples analyzed for molecular weight distribution

| Sample Identification | Test | Carpet Information |
|---|---|---|
| MCR-4 control | MCR-4 | Nylon 6 - tannish/beige carpet fiber |
| MCR-4 ppt | MCR-4 | Precipitate from ChemX process |
| MCR-6 control | MCR-6 | Nylon 6/6 - tannish/beige carpet fiber |
| MCR-6 ppt | MCR-6 | Precipitate from ChemX process |

TABLE 1

Summary of Nylon precipitation samples with DME

| Test | Nylon Sample | Nylon color | Color of formic acid solution (prior to DME exposure) | Color of Precipitated Nylon | Color of Extract (recovered formic acid) |
|---|---|---|---|---|---|
| MCR-4 | Nylon 6 | beige | purple/violet | Off-white fluffy solids | beige (same as nylon) |
| MCR-5 | Nylon 6/6 | beige | Same as carpet | White fluffy solids | slight yellow |
| MCR-6 | Nylon 6/6 | beige | light orange | White fluffy solids | yellowish tint |
| MCR-7 | Nylon 6 | brown | brown (same as nylon) | slight brownish solids | water-white no color |
| MCR-8 | Nylon 6 | dark blue | dark purple/violet | blue solids | purple |
| MCR-9 | Nylon 6/6 | purple | purple | light purple | purple |
| MCR-14 | Nylon 6/6 | purple | | | |
| MCR-15 | Nylon 6 | | | | |

Example 2

Analysis of Integrity of Extracted Polymer

This example demonstrates that the polymer composition is preserved during the extraction processes of the present invention. To test the polymer composition, GPC (Gel Permeation Chromatography) was performed by Jordi Laboratories, Bellingham, Mass. This test quantifies a polymer's molecular weight distribution. Briefly, the Nylon 6 and Nylon 6/6 samples were dissolved in Hexafluoroisopropanol (HFIP) with 0.01M Sodiumtrifluoroacetate (NaTFA). All samples were filtered using 0.45 μm disposable Teflon filters. The samples were run in duplicate in the above solvent. The system was run at a flow rate of 1.0 ml/min on a JORDI DVB Mixed Bed column, 250 mm×10 mm (ID). The column temperature was maintained at 40° C. Injection size was 50 μl of the 2.5 mg/ml sample solution. Polymethyl methacrylate standards with a concentration of 0.5 mg/ml were used (Molecular weight as follows: 903K, 701K, 366K, 110K, 89.3K, 31.6K, 14.7K, 5.09K, 2.58K & 402) with injection size of 100 μl. The samples were monitored at a sensitivity of 8 with a WATERS 401 Differential Refractometer. Data acquisition and handling were made with JORDI GPC software.

Both the raw carpet fiber (control) and precipitated product (FA dissolution followed by DME precipitation) for Nylon 6 (MCR-4) and Nylon 6/6 (MCR-6) were tested. The analyzed samples are shown in Table 2 below. The objective of this In GPC analyses, three different molecular weight averages are commonly used to provide information about polymers. These are the number average molecular weight (Mn), the weight average molecular weight (Mw), and the Z average molecular weight (Mz). Mn provides information about the lowest molecular weight portion of the sample. Mw is the average closest to the center of the peak and Mz represents the highest molecular weight portion of the sample. The different molecular weight averages can each be related to specific polymer properties such as material toughness, tensile strength, and total elongation. By comparing the different averages, it is possible to define a fourth parameter called the polydispersity index (PDI). This parameter gives an indication of how broad a range of molecular weights are in the sample.

Figure 2:
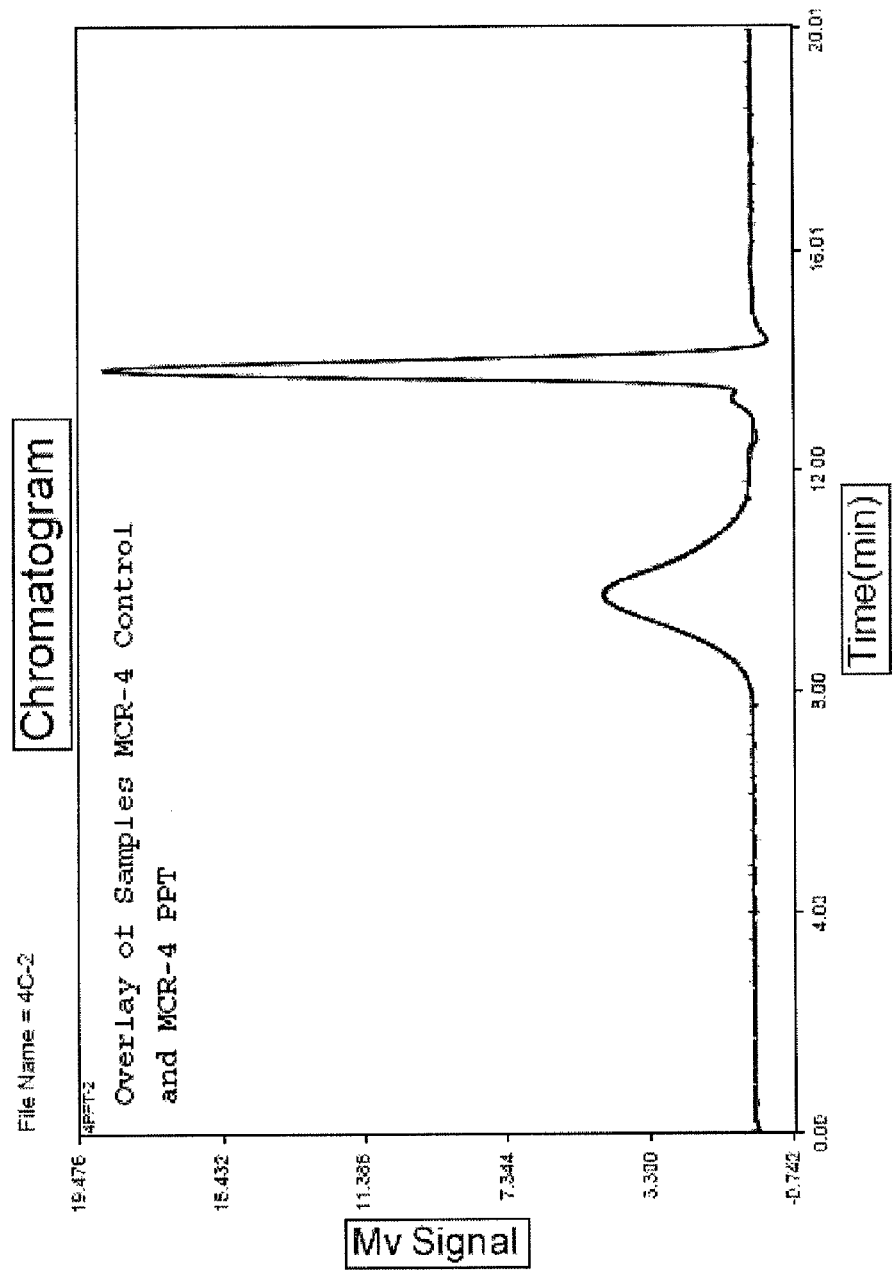
FIG. 2 illustrates Gel Permeation Chromatographs of sample MCR-4 (nylon 6 carpet fiber, beige color). Control=feedstock, unprecipitated; ppt=nylon dissolving in FA solvent and then precipitated using DME antisolvent.
Figure 3:
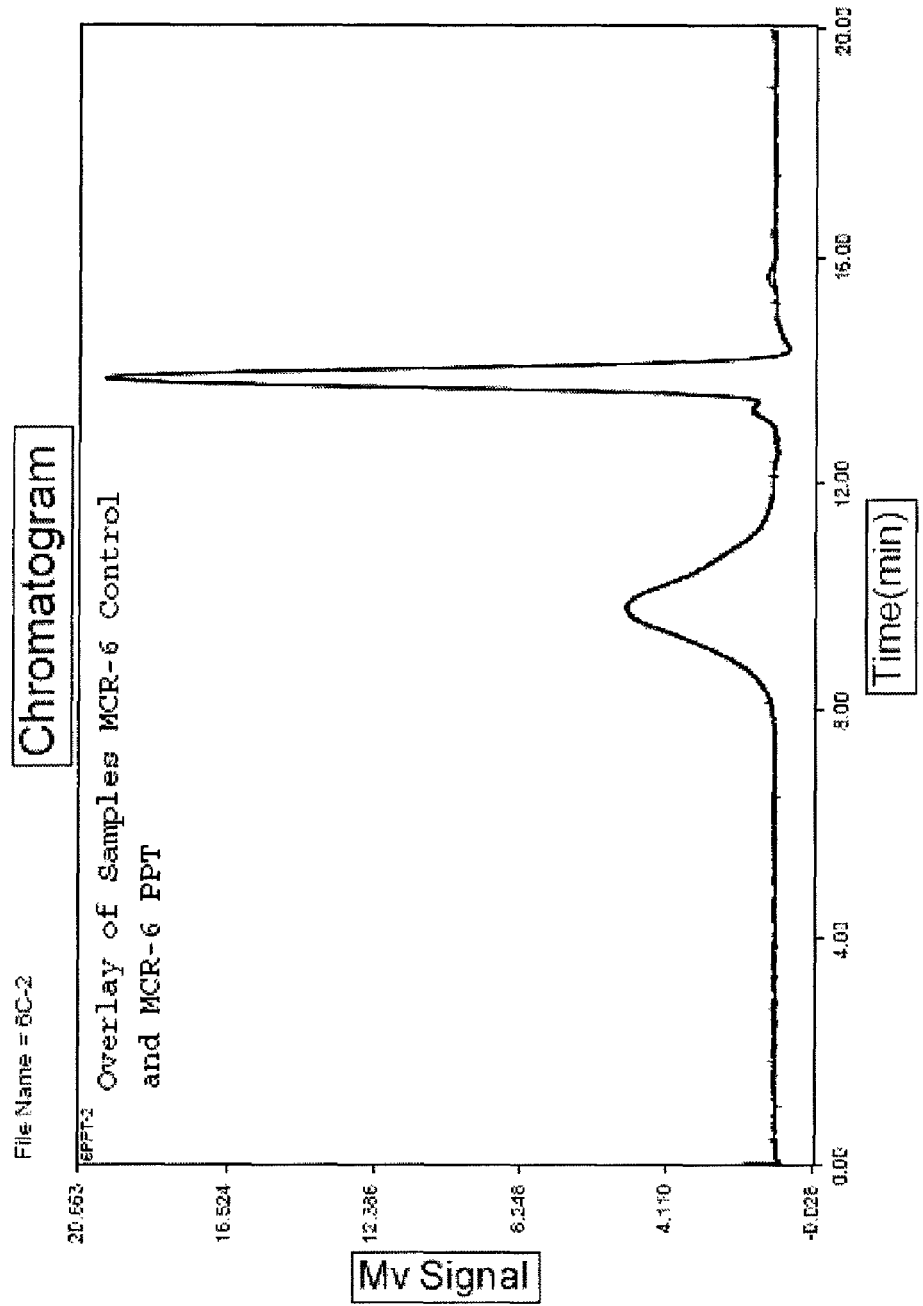
FIG. 3 illustrates Gel Permeation Chromatographs of sample MCR-6 (nylon 6,6 carpet fiber, beige color). Control=feedstock, unprecipitated; ppt=nylon dissolving in FA solvent and then precipitated using DME antisolvent.
Figure 4:
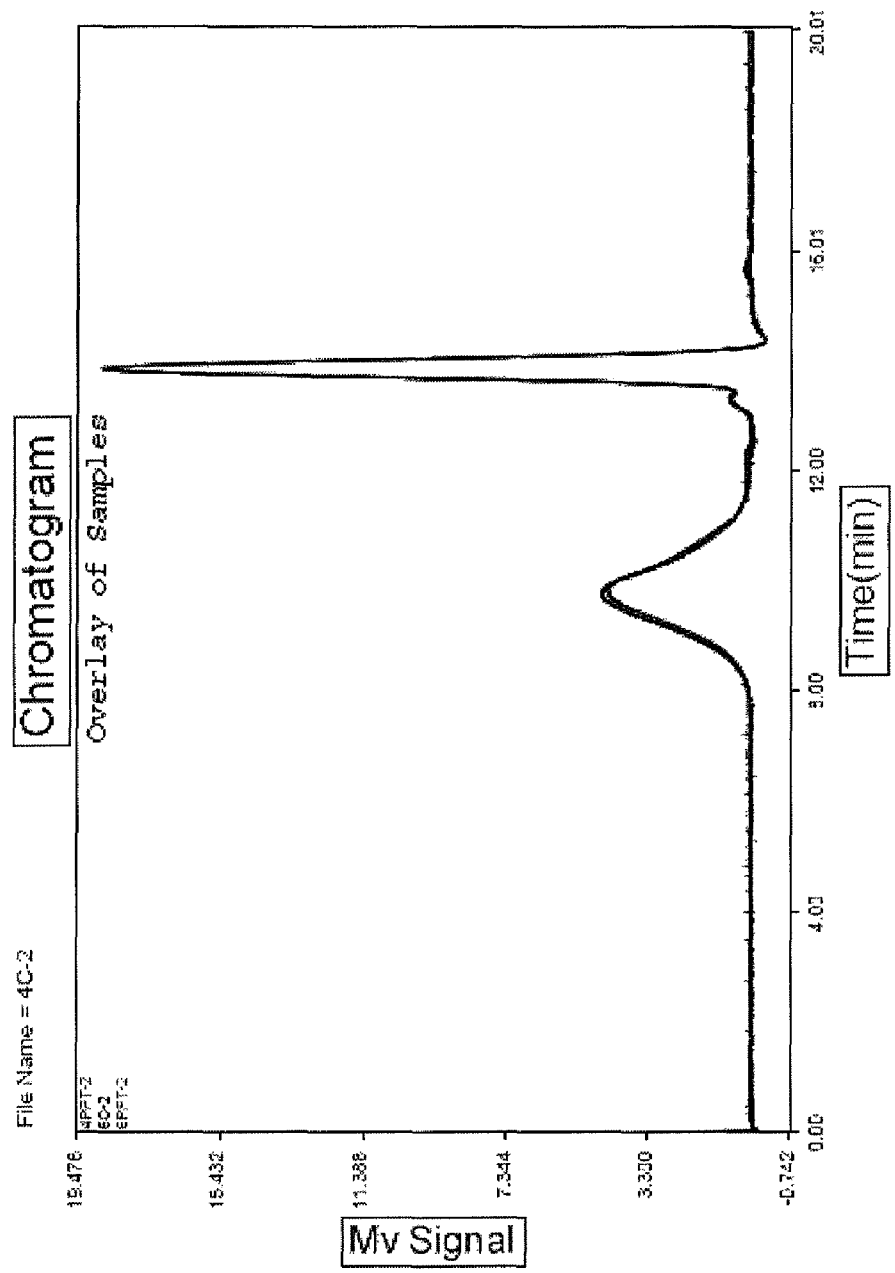
FIG. 4 illustrates that the molecular weight distribution of the nylon 6 and nylon 6,6 sample submitted for analysis were essentially identical.

Table 3 summarizes the results of the GPC analysis. With MCR-4 Control and MCR-4 PPT, Mn, Mw, and Mz are nearly identical. The difference between the control and PPT samples was within the accuracy of the measurement. This is consistent with the conclusion that the FA dissolution of nylon followed by precipitation in DME does not affect the nylon 6 polymer quality. Moreover, with MCR-6 Control and MCR 6 PPT, Mn, Mw, and Mz were also nearly identical, indicating that the process does not change the nylon 6/6 quality. FIGS. 2 and 3 show the chromatographs of the Control and PTT for MCR 4 (Nylon 6) and MCR 6 (Nylon 6/6), respectively. FIGS. 2 and 3 show that the two distributions were essentially identical within the accuracy of the test apparatus. FIG. 4 shows that the molecular weight distributions of the Nylon 6 and Nylon 6/6 tested were also nearly identical. This could be characteristic of the feedstock material.

TABLE 3

Summary of GPC test results for molecular weight distribution

| Sample Name | Run # | Mn | Ave. | Mw | Ave. | Mz | Ave. | PDI | Ave. |
|---|---|---|---|---|---|---|---|---|---|
| MCR-4 Control | 1 | 38,700 | 39,082 | 75,764 | 76,001 | 122,032 | 122,531 | 1.96 | 1.94 |
|  | 2 | 39,465 |  | 76,237 |  | 123,031 |  | 1.93 |  |
| MCR-4 PPT | 1 | 39,196 | 39,100 | 74,001 | 73,815 | 119,301 | 119,133 | 1.89 | 1.89 |
|  | 2 | 39,004 |  | 73,629 |  | 118,954 |  | 1.89 |  |
| MCR-6 Control | 1 | 35,898 | 36,129 | 70,633 | 70,462 | 114,774 | 114,460 | 1.97 | 1.95 |
|  | 2 | 36,361 |  | 70,291 |  | 114,146 |  | 1.93 |  |
| MCR-6 PPT | 1 | 36,312 | 36,163 | 69,514 | 69,529 | 112,400 | 112,548 | 1.91 | 1.92 |
|  | 2 | 36,015 |  | 69,554 |  | 112,696 |  | 1.93 |  |

Example 3

Concurrent Dye Removal with Extraction of Nylon

This example demonstrates the concurrent removal of dye with the extraction of nylon using the processes of the present invention. The influence of repeated treatment of nylon fiber with multiple process stages was examined, where each stage involves dissolving the nylon in FA and subsequently precipitating it in DME. In each stage, the concentration of nylon in FA was maintained constant at 10 wt/vol %. UV absorbance at 530 nm was measured with a 1 w/v % solution from each stage. The data, summarized in Table 4 for nylon 6 and Table 5 for nylon 6/6 shows a decrease in color intensity, demonstrating that the DME is partially removing the dye from the material.

TABLE 4

Concurrent Dye Removal and Extraction of Nylon 6

| Sample | Process Solution Concentration (wt/vol % in formic acid) | Analytical Solution Concentration (wt/vol % in formic acid) | Absorbance of Analytical Solution at 530 nm |
|---|---|---|---|
| Control | — | 1.00 | 2.623 |
| PPt 1 | 10.0 | 1.00 | 2.320 |
| PPt 2 | 10.0 | 1.00 | 2.212 |
| PPt 3 | 10.0 | 1.00 | 2.174 |
| MCR8 PPt | 5.0 | 1.00 | 2.322 |

TABLE 5

Concurrent Dye Removal and Extraction of Nylon 6,6

| Sample | Process Solution Concentration (wt/vol % in formic acid) | Analytical Solution Concentration (wt/vol % in formic acid) | Absorbance of Analytical Solution at 530 nm |
|---|---|---|---|
| Control | — | 1.00 | 1.210 |
| PPt 1 | 10.0 | 1.00 | 1.020 |
| PPt 2 | 10.0 | 1.00 | 0.978 |
| PPt 3 | 10.0 | 1.00 | 0.899 |
| MCR8 PPt | 5.0 | 1.00 | 1.051 |

Example 4

Scaled-Up Extraction of Nylon

Larger samples of nylon 6,6 and nylon 6 were extracted using with the FA solvent/DME antisolvent process.

In the case of nylon 6,6 (MCR-14), a 10-wt % solution of nylon fibers in formic acid (88%) was made and charged to a 3.5L stainless steel vessel. The vessel was outfitted with filter elements at the entrance and exit of the vessel so that no precipitated nylon would be lost during the course of the run. Approximately 78.5 grams of a purple nylon 6,6 carpet fiber was dissolved in a final volume of 800 ml formic acid, resulting in a 10-wt % solution of nylon 6,6 fibers in formic acid (88%). After the vessel was sealed, DME was introduced at the bottom of the vessel to an operating pressure of 80 psi (and room temperature, about 25° C.). Once the operating pressure was reached, DME flow was initiated, entering the bottom of the vessel and exiting at the top, until all the formic acid was removed. The vessel was then degassed and the nylon 6,6 precipitate was recovered as a voluminous, dry powder.

Larger scale extraction of nylon 6 (MCR-15) was performed using the same process as for larger scale extraction of nylon 6,6. The resulting nylon 6 precipitate was voluminous, dry powder, similar to the nylon 6,6 precipitate.

Example 5

Comparison of Different Antisolvents

This example demonstrates the advantages of using DME in comparison to other antisolvents in achieving an energetically efficient and economically viable process for recovering nylon dissolved in formic acid solution. The use of methanol, ethanol, diethyl ether, and ethyl acetate as antisolvents to precipitate nylon dissolved in formic acid was tested. Use of these antisolvents resulted in precipitate globs of nylon, which could not be easily manipulated. The precipitate material was both sticky and tended to form clumps and was not free flowing. These precipitate globs were very unlike the readily manipulable fluffy, powdered precipitate achieved by using DME. Use of diethyl ether produced the best results of the alternative solvents tested, but the resultant precipitated material was still sticky.

The use of liquid-phase carbon dioxide was also tested. Liquid phase carbon dioxide did not effectively precipitate nylon dissolved in 88 wt % formic acid. It was determined that the presence of water prevented the liquid-phase $CO_2$ from being miscible with the formic acid. It was possible to precipitate nylon dissolved in 96 wt % formic acid using liquid-phase $CO_2$ as an antisolvent. However, this process using $CO_2$ as an antisolvent is less energetically and economically efficient than extracting nylon using 88 wt % formic acid and subcritical phase DME. First, using liquid-phase $CO_2$ as an antisolvent requires energy input to maintain pressures of at least about 900 psi (62 bar; 61 atm). Second, formic acid solutions of 88 wt % are readily available; concentrations higher than 88 wt % are considerably more expensive and less readily available.

Example 6

Ratios of Feedstock Fiber, Solvent and Antisolvent

This example demonstrates exemplary ranges of ratios for the nylon feedstock, formic acid solvent and dimethyl ether antisolvent.

The minimal amount of DME required to precipitate the nylon dissolved in formic acid was determined. Table 6 summarizes observations were made of the amount of DME that could be dissolved in FA solutions containing different concentrations of nylon.

TABLE 6

| Nylon concentration in FA (wt %) | Weight Ratio of DME to FA/nylon solution |
|---|---|
| 5 | 0.29 |
| 10 | 0.26 |
| 15 | 0.22 |
| 20 | 0.15 |

The mass of DME was estimated by assuming that the volumetric expansion of the FA/nylon solution was equal to the volume of liquid DME at the system temperature (i.e. DME at saturation conditions at the system pressure) and using the density of DME at saturation conditions.

With nylon at 20 wt % concentration, the introduction of DME equal to 15% of the weight of FA/nylon solution was sufficient to precipitate the nylon. Moreover, it was not necessary to raise the system pressure above atmospheric conditions.

Subsequent to the above, the system was closed from atmosphere and additional DME added until precipitation of nylon was noted. Unexpectedly, in all cases, the system pressure was lower than the saturation pressure for DME. The weight ratio necessary to achieve precipitation was:

TABLE 7

| Nylon concentration in FA (wt %) | Weight Ratio of DME to FA/nylon solution |
|---|---|
| 5 | 0.44 |
| 10 | 0.34 |
| 15 | 0.30 |
| 20 | 0.15 |

In each case, note that approximately 2/3 of the DME mass can be added at atmospheric conditions without causing precipitation. This indicates that, in recycling the FA solution, it is not necessary to fully remove the DME from the FA and that, significant DME can remain in FA solution without adversely impacting the ability of FA to dissolve nylon.

Subsequent to the above tests, the precipitation of 10 wt % and 15 wt % nylon/FA solution was repeated to measure both the volumetric expansion and the system pressure at the moment of catastrophic precipitation. The volumetric expansion was 61% and 44% for 10 and 15 wt % nylon/FA solution, respectively. In both cases, the system pressure was measured at 34.7 psi (2.39 bar; 2.36 atm) at a system temperature of 24° C. At 24° C., the saturation pressure for DME is approximately 85 psi (5.86 bar; 5.78 atm). Thus, precipitation of nylon occurs at pressures well below that necessary for the DME antisolvent to exist in the liquid phase.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of separating a nylon from other materials comprising:
   a) dissolving the nylon in a solvent, wherein the solvent comprises a concentration of at least 85 wt % of a lower aliphatic carboxylic acid, thereby yielding a polymer solution comprised of the nylon dissolved in the solvent; and
   b) contacting the polymer solution with DME, thereby yielding a second solution comprised of the solvent and DME, wherein the nylon precipitates from the second solution, thereby separating the nylon from the other materials.

2. The method of claim 1, further comprising after step a), separating the polymer solution from the other materials not dissolved in the solvent.

3. The method of claim 1, wherein the method is performed at ambient temperature.

4. The method of claim 1, wherein the method is performed at a temperature in the range of 25-35° C.

5. The method of claim 1, wherein the lower aliphatic carboxylic acid is selected from the group consisting of formic acid, acetic acid, propiolic acid, acrylic acid, propionic acid, isocrotonic acid, butyric acid, isobutyric acid, valeric acid, caproic acid, enanthic acid, caprylic acid, and mixtures thereof.

6. The method of claim 1, wherein the lower aliphatic carboxylic acid is formic acid.

7. The method of claim 6, wherein the formic acid comprises a concentration of at least 85 wt % formic acid prior to dissolving the nylon.

8. The method of claim 1, wherein the DME is in subcritical phase.

9. The method of claim 1, wherein the DME is in liquid phase.

10. The method of claim 1, wherein the DME is in gas phase.

11. The method of claim 1, wherein the DME is maintained at a pressure below its vapor pressure.

12. The method of claim 1, wherein the DME is maintained at a pressure below 85 psi (5.9 bar).

13. The method of claim 1, wherein the DME is maintained at a pressure below 40 psi (2.8 bar).

14. The method of claim [[1]] 7, wherein the ratio of DME to formic acid (w/w) is about 0.1:1.0 or greater.

15. The method of claim 1, wherein the nylon dissolved in the solvent is at a concentration of about 20 wt % or less.

16. The method of claim 1, wherein the nylon is selected from the group consisting of nylon 6, nylon 6,6, nylon 8, nylon 10, nylon 11, nylon 6,10, polyhexamethylene adipamide, polyamide-4,6, polyamide-12, and mixtures thereof.

17. The method of claim 1, wherein the nylon is nylon 6.

18. The method of claim 1, wherein the nylon is nylon 6/6.

19. The method of claim 1, wherein the nylon precipitated from the second solution is comprised of particles with an average diameter of at least about 50 μm.

20. The method of claim 1, wherein the nylon precipitated from the second solution is in the form of free-flowing particles.

21. The method of claim 1, wherein the nylon precipitated from the second solution is at least 90% purified from the other material.

22. The method of claim 1, further comprising the step of removing residual DME from the precipitated nylon.

23. A method of separating nylon from commingled materials comprising:
   a) dissolving the nylon in formic acid, wherein the formic acid comprises a concentration of at least 85 wt % formic acid prior to dissolving the nylon, thereby yielding a polymer solution comprised of the nylon dissolved in the formic acid;
   b) separating the polymer solution from the other materials not dissolved in the formic acid; and
   c) contacting the polymer solution with gas phase DME, thereby yielding a second solution comprised of the formic acid and DME, wherein the nylon precipitates from the second solution, thereby separating the nylon from the other materials.

24. A method of isolating a nylon comprising contacting a nylon dissolved in a solvent comprising a concentration of at least 85 wt % of a lower aliphatic carboxylic acid solvent with dimethyl ether (DME), thereby precipitating the nylon.

25. The method of claim 24, wherein the solvent is formic acid.

26. The method of claim 24, wherein the DME is in subcritical phase.

27. The method of claim 24, wherein the method is performed at ambient temperature.

* * * * *